(12) United States Patent
Farwell et al.

(10) Patent No.: US 6,920,545 B2
(45) Date of Patent: Jul. 19, 2005

(54) RECONFIGURABLE PROCESSOR WITH ALTERNATELY INTERCONNECTED ARITHMETIC AND MEMORY NODES OF CROSSBAR SWITCHED CLUSTER

(75) Inventors: William D. Farwell, Thousand Oaks, CA (US); Kenneth E. Prager, Granite Bay, CA (US)

(73) Assignee: Raytheon Company, Waltham, MA (US)

( * ) Notice: Subject to any disclaimer, the term of this patent is extended or adjusted under 35 U.S.C. 154(b) by 509 days.

(21) Appl. No.: 10/052,082

(22) Filed: Jan. 17, 2002

(65) Prior Publication Data

US 2003/0135710 A1 Jul. 17, 2003

(51) Int. Cl.[7] .............................................. G06F 15/173
(52) U.S. Cl. ........................... 712/15; 711/148; 712/11; 712/28; 712/32
(58) Field of Search ........................... 711/148; 712/11, 712/15, 28, 32

(56) References Cited

U.S. PATENT DOCUMENTS

| | | | | |
|---|---|---|---|---|
| 4,773,067 A | * | 9/1988 | Duxbury et al. ............. | 370/446 |
| 5,625,831 A | * | 4/1997 | Priest et al. ................. | 713/500 |
| 5,740,350 A | | 4/1998 | Rabins et al. ................. | 714/10 |
| 5,784,636 A | | 7/1998 | Rupp .......................... | 712/37 |
| 5,802,290 A | | 9/1998 | Casselman ................... | 709/201 |
| 6,023,755 A | | 2/2000 | Casselman ................... | 712/37 |
| 6,085,317 A | | 7/2000 | Smith ........................... | 713/1 |
| 6,219,785 B1 | | 4/2001 | Smith ........................... | 713/1 |
| 6,282,583 B1 | * | 8/2001 | Pincus et al. ................ | 709/400 |
| 6,362,650 B1 | * | 3/2002 | New et al. .................... | 326/41 |
| 2003/0007457 A1 | * | 1/2003 | Farrell et al. ................ | 370/235 |
| 2003/0037200 A1 | * | 2/2003 | Mitchler ...................... | 710/316 |
| 2003/0040898 A1 | * | 2/2003 | McWilliams et al. ......... | 703/21 |

* cited by examiner

Primary Examiner—Kenneth S. Kim
(74) Attorney, Agent, or Firm—Leonard A. Alkov; Karl A. Vick

(57) ABSTRACT

A reconfigurable processor architecture. A reconfigurable processor is an array of a multiplicity of various functional elements, between which the interconnections may be programmably configured. The inventive processor is implemented on a single substrate as a network of clusters of elements. Each cluster includes a crossbar switching node to which a plurality of elements is connected via ports. Additional ports on the crossbar switching node connect to the switching nodes of nearest neighbor clusters. The crossbar switching nodes allow pathways to be programmably set between any of the ports, and any pathway may be set to be either registered or unregistered. The use of clusters of processing elements allows complete freedom of local connectivity for effective configuration of many different processing functions. Wide area interconnection is more restricted, but, since it is less used, does not significantly restrict configurability. The inventive processor thus provides 1) high configurability with a low cost of switching network overhead; 2) constant clock speed, independent of configuration; and 3) very high clock speed since all communication is local or nearest neighbor.

7 Claims, 8 Drawing Sheets

US 6,920,545 B2

RECONFIGURABLE PROCESSOR WITH ALTERNATELY INTERCONNECTED ARITHMETIC AND MEMORY NODES OF CROSSBAR SWITCHED CLUSTER

BACKGROUND OF THE INVENTION

1. Field of the Invention

The present invention relates to computer architectures. More specifically, the present invention relates to reconfigurable computer architectures.

2. Description of the Related Art

Most processing operations are currently performed using a fixed hardware architecture on which programmable software is executed. However, many processes are more readily implemented in hardware. For these operations, dedicated hardware can typically execute a given algorithm 2–3 orders of magnitude faster and more efficiently than software. Unfortunately, dedicated hardware is inflexible and can not easily be changed to perform functions other than those for which it was originally designed. Accordingly, reconfigurable computers have been developed as a compromise between the processing speed afforded by dedicated hardware and the flexibility afforded by software.

Reconfigurable computers consist of a multiplicity of programmably interconnected elements, whose functions are also programmable. Reconfigurable computers can be either fine-grained or coarse-grained. Fine-grained architectures, e.g., Field Programmable Gate Arrays (FPGAs), consist of thousands or millions of very simple Boolean functions connected by an elaborate programmable interconnection scheme. Coarse-grained architectures consist of tens to hundreds of complex elements, such as 8, 16, or 32 bit arithmetic operators, controllers, or even general-purpose processors.

In accordance with conventional teachings, interconnection among elements is commonly implemented as an X-Y mesh of data links, either 1) busses, to which elements can optionally connect, or 2) point-to-point links. Unfortunately, there are costs associated with the additional components required to provide for reconfigurability of reconfigurable computers constructed in accordance with conventional teachings. That is, reconfigurable computers constructed in accordance with conventional teachings tend to consume too much space, i.e., die area, on an integrated circuit; tend to be too slow and tend to consume too much power for many current applications.

Accordingly, a need remains in the art for more efficient ways to implement reconfigurable computers while at the same time retaining good flexibility of configuration. Specifically, a need remains in the art for a reconfigurable computer architecture that is fast while consuming less die area and power relative to reconfigurable computers implemented in accordance with conventional teachings.

SUMMARY OF THE INVENTION

The need in the art is addressed by reconfigurable processor architectures of the present invention. Generally, the inventive processor is implemented on a single substrate on which a network of clusters is disposed. Each cluster includes a switching node to which a plurality of elements is connected.

In a specific embodiment, the switching node is comprised of a non-blocking crossbar switch, to which the inputs and outputs of every element in the cluster connect. Also connected to the crossbar are a multiplicity of ports to all of the physically adjacent clusters. The non-blocking crossbar switch provides unrestricted configurability of connections between elements within a cluster.

The number and type of elements in a cluster is selected such that it is possible to configure many important functions entirely within a cluster. At the same time, the number of elements (and thus the size of the crossbar) is kept small enough that the size of the crossbar does not become prohibitive. The invention thus provides a means to balance the two features of 1) ease of configuration and 2) percentage of chip resources devoted to configure interconnect switching. Note that once this balance is set, the reconfigurable array can be made indefinitely large by increasing the number of clusters, and the ratio of processing resources (elements) to interconnect resources remains constant.

In the illustrative embodiment, arithmetic clusters are provided which interconnect to a plurality of memory clusters. Each arithmetic cluster includes an arithmetic crossbar switch to which a number of processing elements are connected. In the illustrative embodiment, the processing elements include arithmetic logic units and multiplier/accumulators.

Each memory cluster includes a memory crossbar switch to which a number of memory elements are connected. In the illustrative embodiment, a mechanism is provided for selectively addressing the clusters, the processing elements and the memory elements individually.

The present invention enables a fast reconfigurable computer architecture that consumes less die area and power relative to reconfigurable computers implemented in accordance with conventional teachings.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
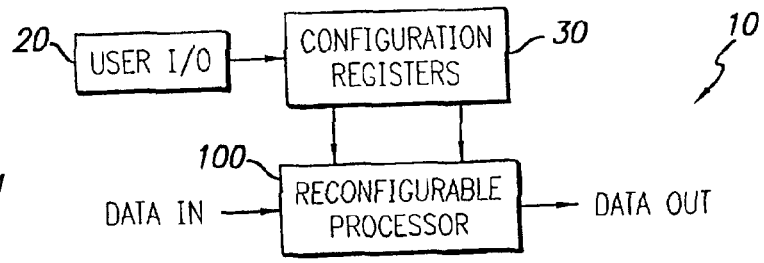
FIG. 1 is a block diagram of a reconfigurable computer system implemented in accordance with the teachings of the present invention.

FIG. 1 is a block diagram of a reconfigurable computer system 10 implemented in accordance with the teachings of the present invention. The system 10 includes a user interface 20 that provides data to configuration registers 30. The registers 30 serve to configure a reconfigurable processor 100 implemented in accordance with the present teachings as per instructions provided by a user. As discussed more fully below, the reconfigurable processor 100 employs a novel and advantageous architecture. The inventive architecture is discussed more fully below with reference to FIG. 2.

Figure 2:
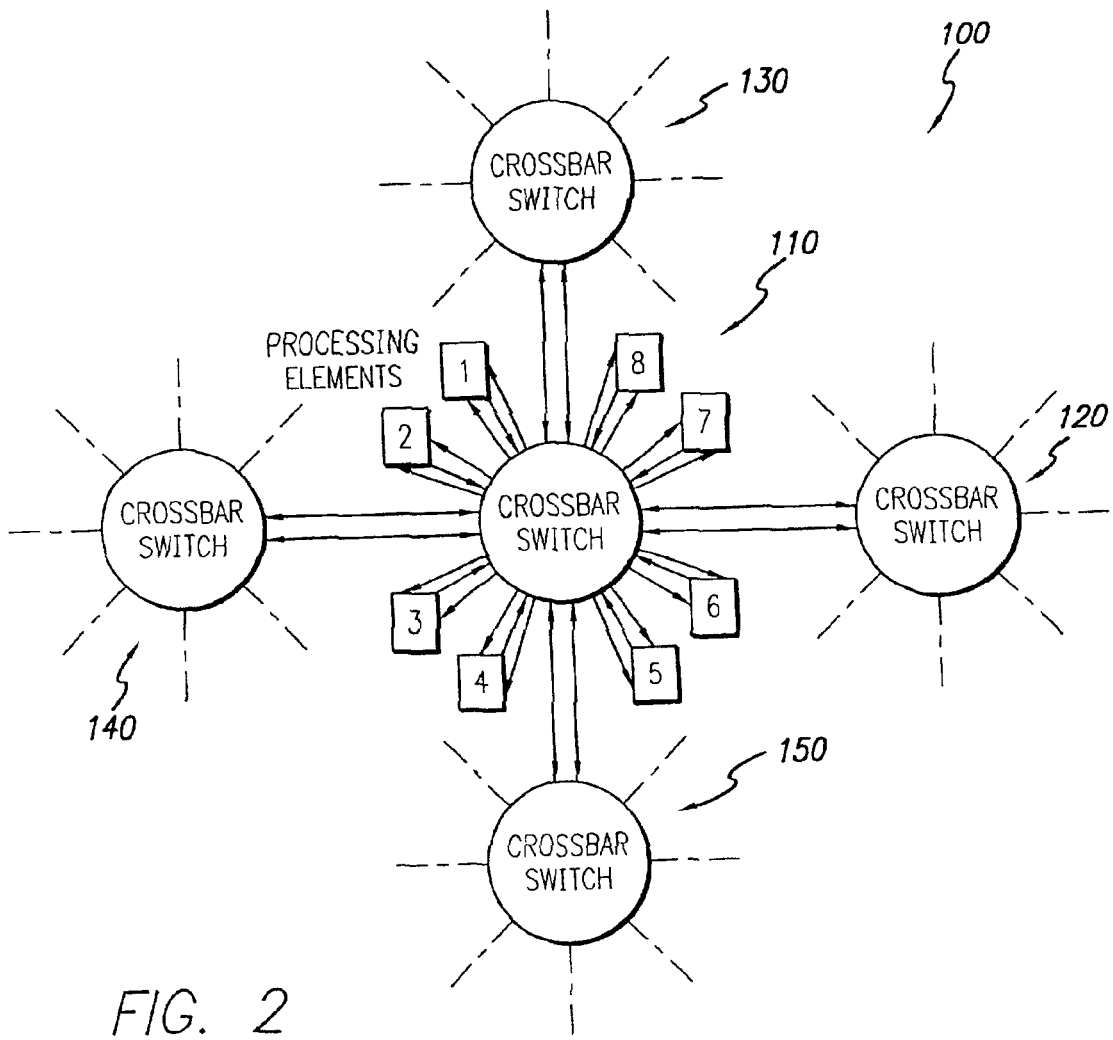
FIG. 2 is a diagram that illustrates the architecture of a reconfigurable processor implemented in accordance with the teachings of the present invention.

FIG. 2 is a diagram that illustrates the architecture of a reconfigurable processor implemented in accordance with the teachings of the present invention. The processor 100 includes a plurality of clusters 110, 120, 130, 140, and 150. Appreciation of the novel architecture of the processor 100 of the present invention is facilitated with reference to the architecture of a reconfigurable processor implemented in accordance with conventional teachings.

Figure 3:
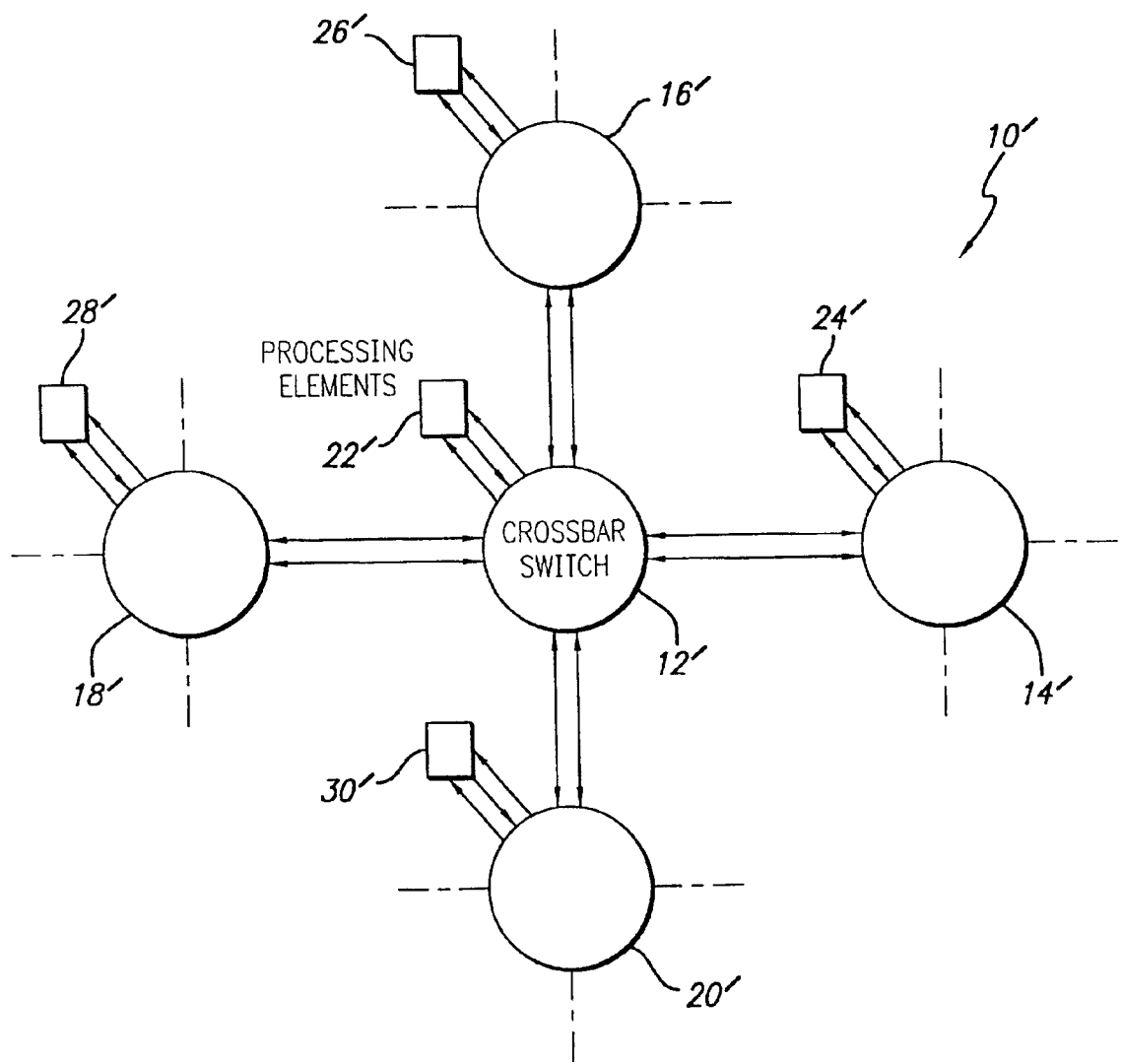
FIG. 3 is a diagram showing a simplified, magnified, partial view of a reconfigurable processor implemented in accordance with conventional teachings.

FIG. 3 is a diagram showing a simplified, magnified, partial view of a reconfigurable processor implemented in accordance with conventional teachings. The conventional reconfigurable processor architecture 10' typically includes a plurality of substantially identical crossbar switches 12', 14', 16', 18', and 20' to which a corresponding processing element 22', 24', 26', 28', and 30', are connected, respectively. The crossbar switches 12', 14', 16', 18', and 20' are essentially switching nodes and serve to ensure activation of appropriate processing elements in the array. As mentioned above, interconnection is commonly implemented as an X-Y mesh of data links to nearest neighbor elements, with options of send, receive, or pass-through, implemented with programmable crossbar switches.

Unfortunately, there are costs associated with the additional components required to provide for reconfigurability of reconfigurable computers constructed in accordance with conventional teachings. That is, reconfigurable computers constructed in accordance with conventional teachings can be difficult to configure due to limitations on connectivity across multiple nodes; consume too much space, i.e., die area, on an integrated circuit; tend to be too slow; and tend to consume too much power for many current applications.

Hence there has been a need the art for more efficient ways to implement reconfigurable computers. Specifically, a need has existed in the art for a reconfigurable computer architecture that is fast and easy to configure while consuming less die area and power relative to reconfigurable computers implemented in accordance with conventional teachings. The need the art is addressed by the reconfigurable computer architecture the present invention. The advantageous design of the present invention relative to the prior art is best appreciated with reference to FIG. 2.

FIG. 2 is a diagram showing a simplified, magnified, partial view of a reconfigurable processor implemented in accordance with the present teachings. As is evident from FIG. 2, the inventive processing architecture 100 includes a plurality of clusters of which 110, 120, 130, and 140 are shown in the figure. In accordance with the invention, one or more of these clusters includes a crossbar switching element and numerous processing elements. Further, in accordance with the invention, each of the processing elements are registered, and every path through the crossbar switch may be configured to either have or not have a register.

Figure 4:
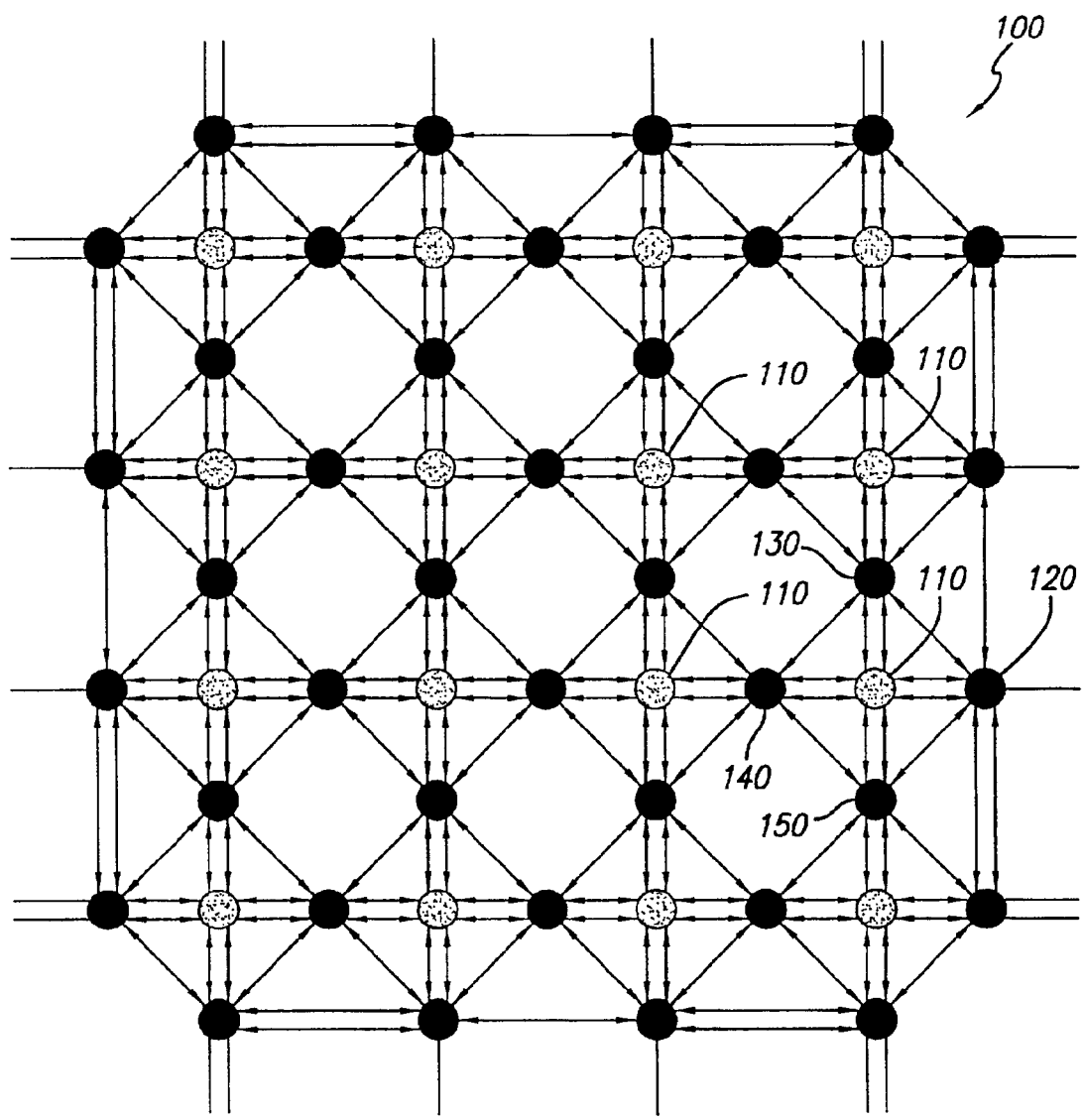
FIG. 4 is a diagram showing a large array of elements expanding upon FIG. 2.
Figure 4:
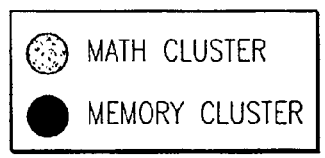
Figure 5:
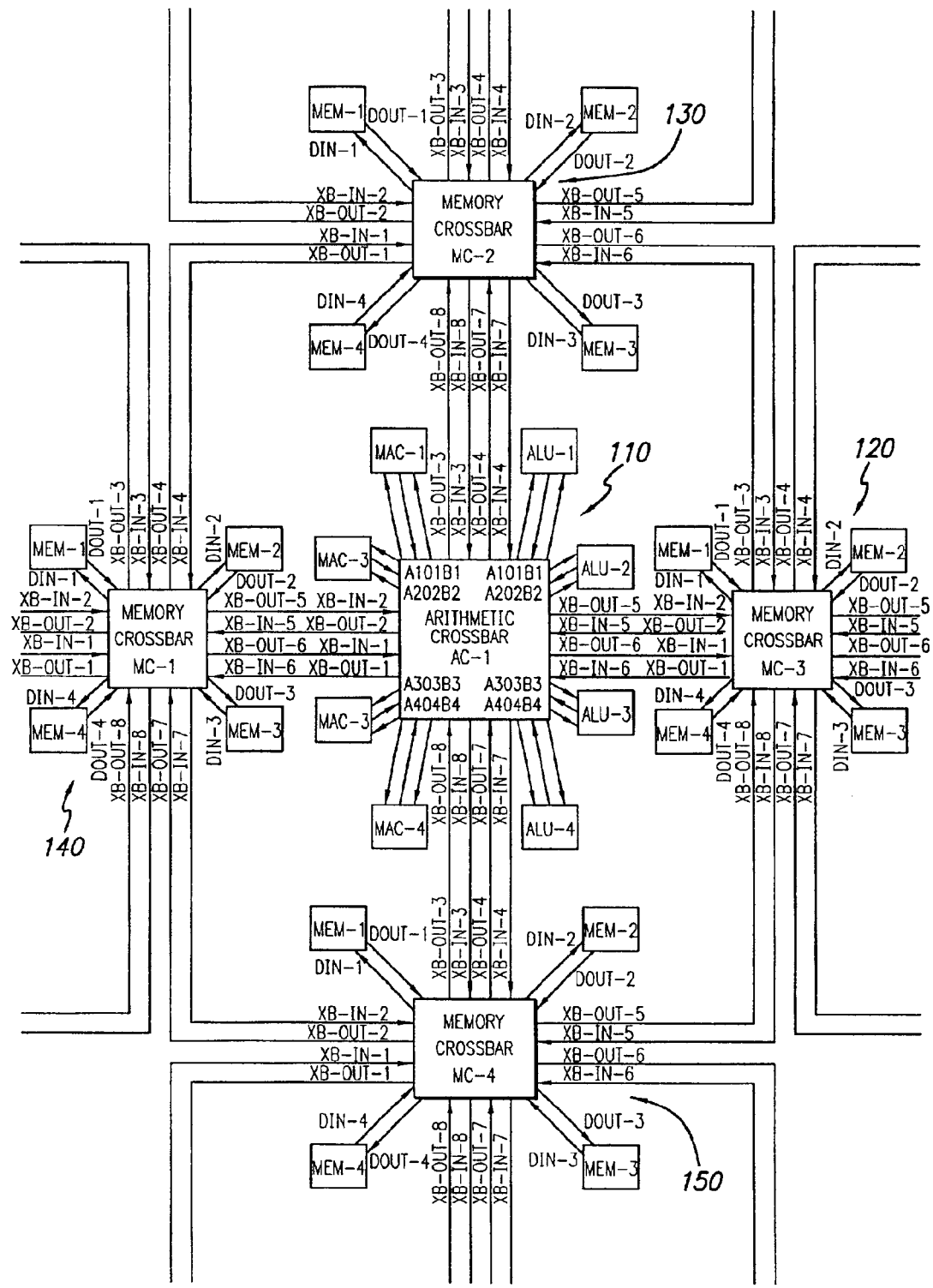
FIG. 5 is a diagram showing an illustrative implementation of a reconfigurable processor in accordance with the teachings of the present invention.

FIG. 5 is a diagram showing an illustrative implementation of a reconfigurable processor in accordance with the teachings of the present invention. In the embodiment of FIG. 5, a first cluster 110 is an arithmetic cluster while the neighboring clusters 120, 130, 140, and 150 are memory clusters. Directly connected to the arithmetic cluster 110 are several processing elements including several arithmetic logic units ALU-1 through ALU-4 and several multiplier-accumulator circuits MAC-1 through MAC-4. In the illustrative embodiment of FIG. 5, plural memory elements MEM-1 through MEM-4 are connected to each of the memory clusters 120, 130, 140, and 150. The pattern shown in FIG. 5 is repeated to provide the mesh network shown in FIG. 4.

In an illustrative implementation, the processor 100 includes a number, n, math clusters 110 and $2(n+\sqrt{n})$ memory clusters. Each memory cluster may have 4 dual port random access memories (RAMs). Each arithmetic cluster may have 8 arithmetic elements. Each cluster includes a non-blocking crossbar switch. In the illustrative implementation, the links between clusters are 32-bit bi-directional links. The processor 100 includes programmable control sequencers for each element, memory and crossbar thereof. The mesh network shown in FIG. 4 illustrates n=16 arithmetic clusters, with 40 memory clusters.

Figure 6:
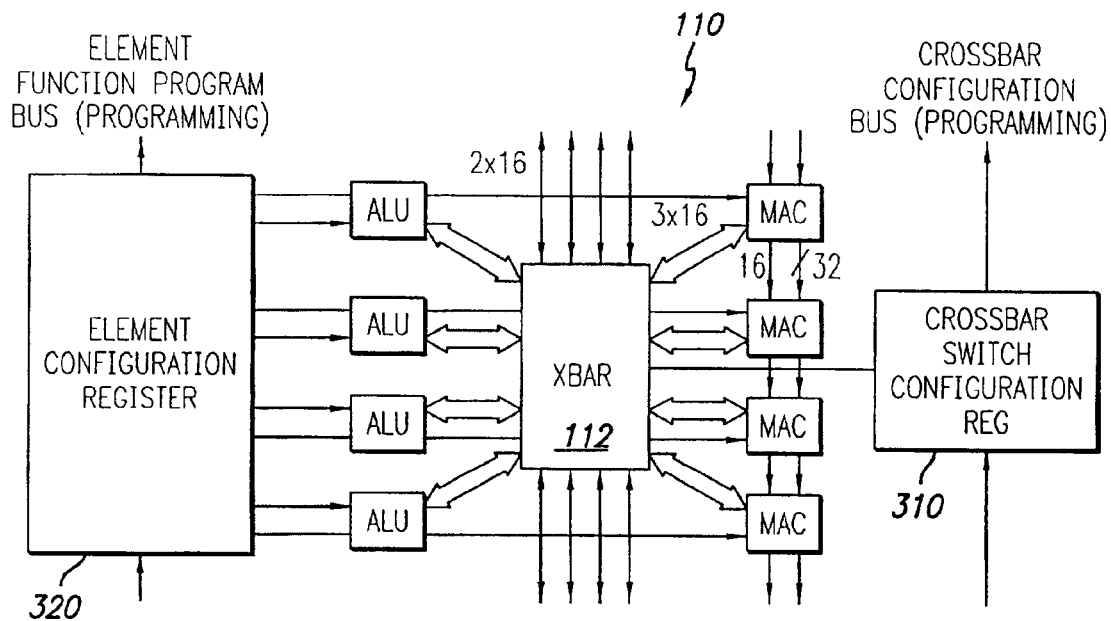
FIG. 6 is a diagram showing an illustrative implementation of a math cluster adapted for use with a reconfigurable processor implemented in accordance with the present teachings in isolation along with crossbar switch and element configuration registers therefore.

FIG. 6 is a diagram showing a math cluster in isolation along with crossbar switch and element configuration registers therefore. This cluster architecture is optimized for signal processing applications and consists of eight elements as follows:

1) 4-Multiplier-Accumulators (MACs)
2) 4-Arithmetic Logic Units (ALUs)
3) 1-Crossbar switch with two inputs to and one output from each of the 8 elements, as well as sixteen inputs from nearest neighbors and eight outputs to nearest neighbors.

As shown in FIG. 6, crossbar switch configuration registers 310 are included to facilitate selection of a predetermined cluster while the element configuration registers 320 facilitate selection of a particular processing element within a selected cluster. The switch configuration registers 310 and the element configuration registers 320 are provided within the configuration registers block 30 of FIG. 1 and are programmed via the user interface numeral 20.

This arithmetic cluster is optimized to efficiently perform a wide range of signal processing functions and superfunctions. Examples include but are not limited to:

1) Complex addition and subtraction
2) Complex products
3) Sum and difference of complex products
4) Convolution of real and complex vectors
5) Finite Impulse Response (FIR) and Infinite Impulse Response (IIR) filtering
6) The butterfly operation of the Fast Fourier Transforms (FFT)

The advantage of a cluster of this type in a reconfigurable computer array is that many common signal processing operations may be efficiently performed within a cluster. This has the following benefits:

1) Inter cluster communication is minimized, making application programming more tractable 2) It is easier to program functions that execute within a cluster (since all elements are fully connected with no blockages, there are no communication bottleneck issues and data path delays are known). This makes the creation of programming macro libraries easier.

A second advantage is that all register-to-register paths are either local (within-cluster) or between nearest-neighbor clusters. Thus clock rate is maximized and is constant for any configuration.

For many signal processing applications, a large number of memories are needed to compliment arithmetic operations. These memories are for data buffering, data re-ordering, and for coefficient tables. Accordingly, in accordance with the teachings of the present invention, a memory cluster 120 is defined to complement the arithmetic cluster 110. For the arithmetic cluster 110 described above, eight large memories are provided in two memory clusters. There are at least 2 memory clusters per arithmetic cluster in the array depicted in FIG. 2. Note that the number of memory clusters per arithmetic cluster is equal to $$\frac{2(n+\sqrt{n})}{n} = 2\left(1 + \frac{1}{\sqrt{n}}\right).$$

Figure 7:
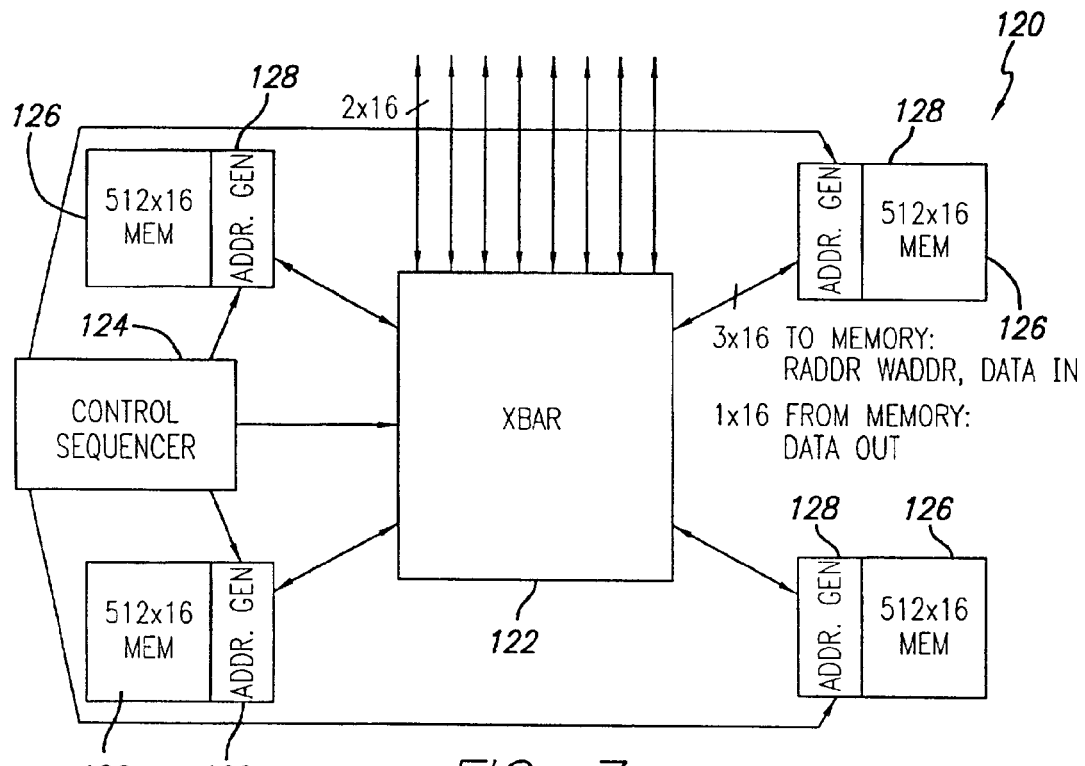
FIG. 7 is a block diagram of an illustrative implementation of a memory cluster utilized in the reconfigurable processor of the present invention.

FIG. 7 is a block diagram of an illustrative implementation of a memory cluster utilized in the reconfigurable processor of the present invention. The memory cluster 120 includes a crossbar switch 122, a control sequencer 124, four large memory elements 126, and address generators 128.

Those of ordinary skill in the art will note the following salient features of the invention:

1) Arithmetic clusters connect only to memory clusters. For the majority of applications the source and destination for arithmetic clusters is memory, so this approach optimizes the locality of communication. In cases where an arithmetic cluster communicates to another arithmetic cluster, to more distant memory, or to I/O, one or more memory cluster crossbars are set to "pass-through" for the required number of links. Registers may be configured into the crossbar pass-through links, so the length of cross-chip communication paths do not affect clock rate.

2) In balanced operation, there are 8 large memories available to every arithmetic cluster (e.g., an arithmetic cluster may utilize 4 memories in each of 2 memory clusters, or 2 memories in each of 4 memory clusters).

3) There are "surplus" link ports in the memory clusters (8 mesh links for 4 memories). In many applications, such as a butterfly, the arithmetic cluster uses only one link per memory (e.g., either read or write). Thus four links (or two complete pass-through paths) are available at each memory cluster for wide area communication, simultaneously with full memory utilization.

4) The diagonal links between the memory clusters support wide-area communication, and allow any element to communicate with another element, throughout the array.

An important example is an FFT application, where each arithmetic cluster (along with 8 memories, 2 at each of the 4 adjoining memory clusters) performs a complete butterfly. There are as many simultaneous butterfly operations as arithmetic clusters. Every element is used, yet there are sufficient extra links and pass-throughs (via memory diagonal links) to pass intermediate results from one butterfly operation to the next, concurrently with calculations.

Those of ordinary skill in the art will be able to program the reconfigurable processor of the present invention for variety of applications using conventional teachings without undue experimentation. Nonetheless, an illustrative application is provided below.

Figure 8:
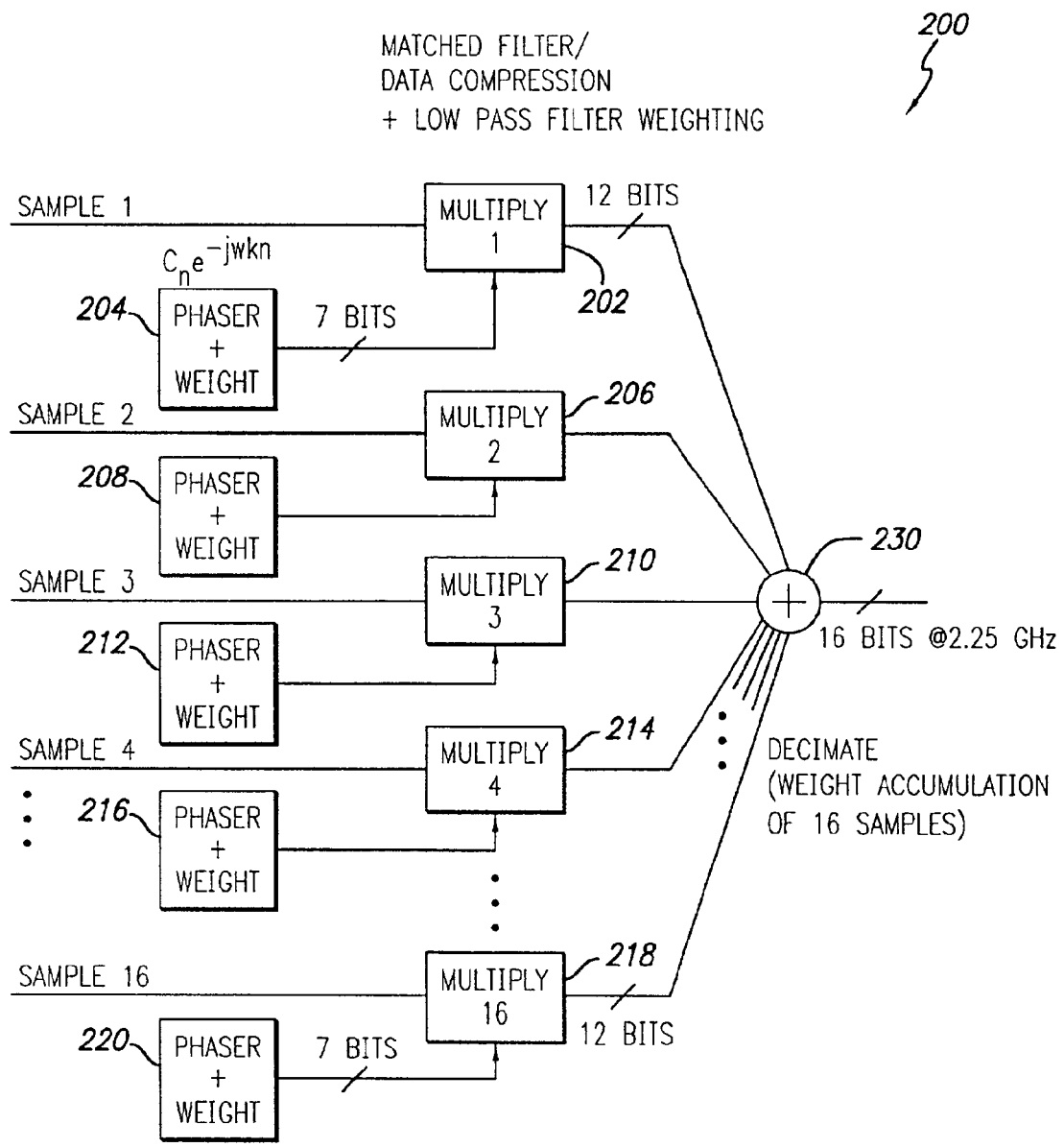
FIG. 8 is an algorithmic representation of a typical receiver/downconverter.

FIG. 8 is an algorithmic representation of a typical receiver/downconverter. As shown in the algorithm 200, a receiver/downconverter may be implemented by multiplying a plurality of received data samples 1–16 by a phaser and a weight and accumulating the results.

Figure 9:
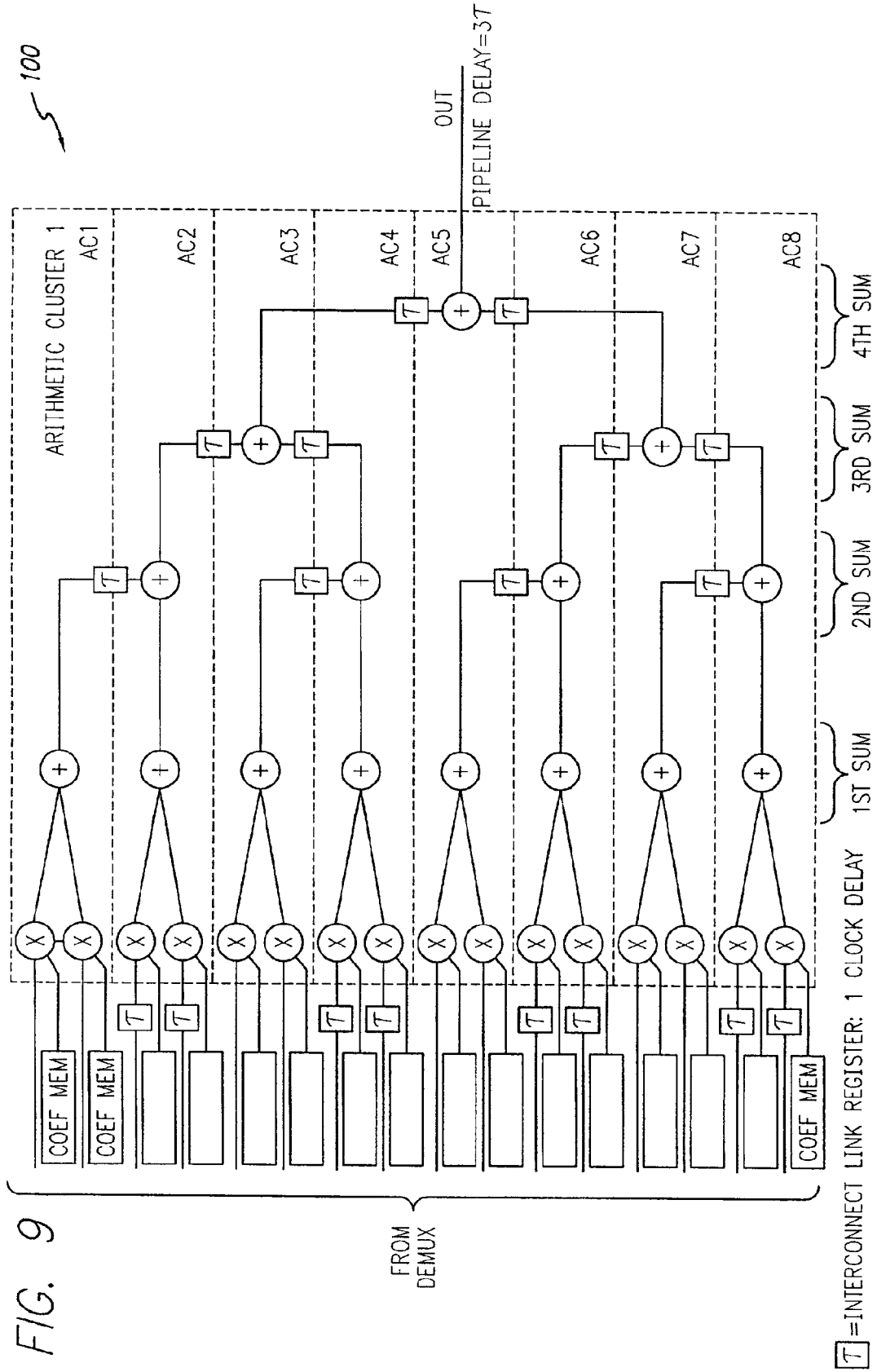
FIG. 9 is a diagram showing how the reconfigurable processor of the present invention may be programmed to implement the algorithm of FIG. 8.

FIG. 9 is a diagram showing how the reconfigurable processor of the present invention 100 may be programmed to implement the algorithm 200 of FIG. 8. Each arithmetic cluster (AC) is shown as having four multipliers and six adders or accumulators. As is evident in FIG. 9, in each cluster AC1, incoming samples from a demultiplexer (not shown) are multiplied by a coefficient stored in memory and accumulated with the output of an adjacent cluster. The accumulated result is subject to a time delay (one clock cycle) and added to accumulated products in a third cluster, e.g., AC3. In a fourth summing operation, the result is added to the products accumulated in a second set of four arithmetic clusters AC5–AC8 to provide the desired output.

Figure 10:
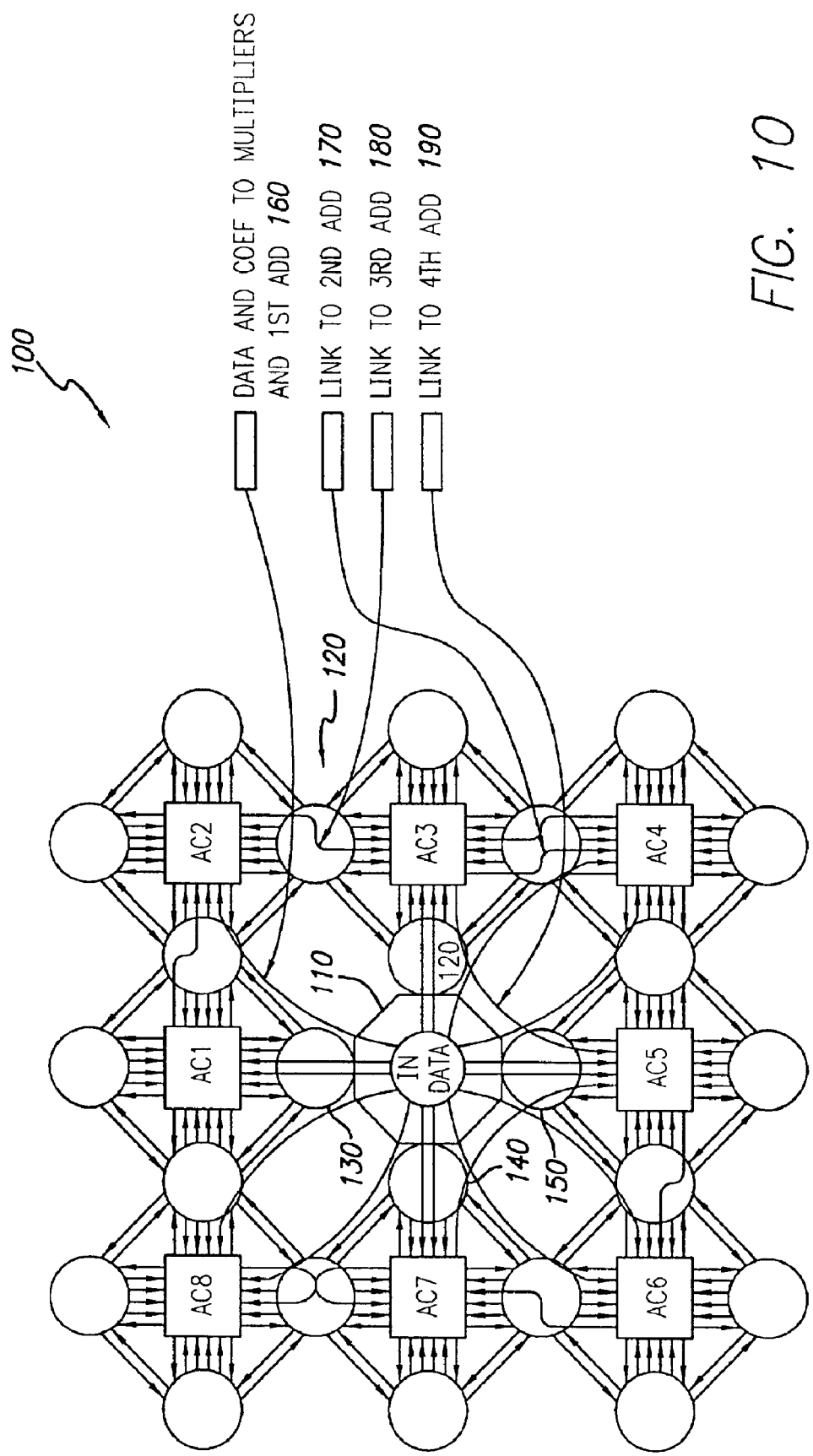
FIG. 10 is a diagram showing an illustrative topological signal mapping of a reconfigurable processor implemented in accordance with the present teachings to implement the algorithm shown in FIGS. 8 and 9.

FIG. 10 is a diagram showing an illustrative topological signal mapping of a reconfigurable processor implemented in accordance with the present teachings to implement the algorithm shown in FIGS. 8 and 9. The data and coefficients to the multipliers used in the first summing operation are shown in red at 160. Shown in purple at 170 are the links to the second stage accumulators. Shown in blue at 180 are the links to the third stage simulators and shown in green at 190 are the links to the fourth stage simulators. This topology was chosen to equalize power in each of 8 arithmetic clusters for uniform power density.

Those skilled in the art will appreciate the following advantages of the present invention:

1) The degree of potential connectivity among local (within cluster) elements (in the example, eight elements) is greater than prior designs, providing easier configuration.

2) The number of transistors and chip area devoted to crossbars (which implement the programming of interconnection) is reduced. Even though the size of the node crossbar is increased, there are many fewer node crossbars for a given number of elements. (For a cluster size of 8, the reduction may be a factor of 1.9×.)

3) The communication length (number of pass-through nodes traversed) is shorter for non-nearest-neighbor communication. (For cluster-size 8, the number of links to go across-chip decreases by a factor of 3.)

4) If most interactions of elements within a cluster are among themselves (e.g., if the cluster can implement a "super function" totally within itself), then fewer node-to-node links are used than with single-processor-per-node architectures. This makes configuration simpler.

5) Since each element is registered, and crossbar pathways may be programmably registered. The clock rate is maximized (because all register-to-register paths are either local or nearest neighbor).

6) The maximum clock rate is assured, no matter what interconnection configuration may be implemented.

In the current best mode, the reconfigurable processor is implemented on a single substrate (not shown), using silicon CMOS or silicon germanium (SiGe) technology.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A reconfigurable processor comprising:

a substrate;

a plurality of arithmetic clusters disposed on said substrate, each of said arithmetic clusters including an arithmetic crossbar switch and a plurality of processing elements connected thereto;

a plurality of memory clusters disposed on said substrate, said memory clusters interconnecting said arithmetic clusters and each of said memory clusters including a memory crossbar switch and a plurality of memory elements connected thereto; and means for selectively addressing said clusters and said elements connected thereto.

2. The invention of claim 1 wherein at least one of said processing elements is an arithmetic logic unit.

3. The invention of claim 2 wherein plural of said processing elements are arithmetic logic units.

4. The invention of claim 1 wherein at least one of said processing elements is a multiplier/accumulator.

5. The invention of claim 4 wherein plural of said processing elements are multiplier accumulators.

6. The invention of claim 1 wherein said means for selectively addressing said clusters and said elements includes a switch configuration register.

7. The invention of claim 1 wherein said means for selectively addressing said clusters and said elements includes an element configuration register.

* * * * *